(12) United States Patent
Figovsky

(10) Patent No.: US 7,989,541 B2
(45) Date of Patent: Aug. 2, 2011

(54) LIQUID SOLVENTLESS SYNTHETIC-RUBBER-BASED COMPOSITION

(75) Inventor: Oleg Figovsky, Haifa (IL)

(73) Assignees: Nanotech Industries, Inc., Daly City, CA (US); Polymate, Ltd., Migdal Ha'emeq (IL)

( * ) Notice: Subject to any disclaimer, the term of this patent is extended or adjusted under 35 U.S.C. 154(b) by 420 days.

(21) Appl. No.: 12/315,579

(22) Filed: Dec. 4, 2008

(65) Prior Publication Data

US 2010/0144929 A1    Jun. 10, 2010

(51) Int. Cl.
| | |
|---|---|
| *B60C 1/00* | (2006.01) |
| *C08K 3/30* | (2006.01) |
| *C08K 3/34* | (2006.01) |
| *C08K 3/04* | (2006.01) |
| *C08K 5/00* | (2006.01) |
| *C08G 18/42* | (2006.01) |

(52) U.S. Cl. ........ 524/526; 524/418; 524/493; 524/495; 524/496; 524/500; 524/515

(58) Field of Classification Search .................. 524/418, 524/493, 495, 496, 500, 515, 526
See application file for complete search history.

(56) References Cited

U.S. PATENT DOCUMENTS

| | | | |
|---|---|---|---|
| 4,195,009 A | 3/1980 | Zimmermann | |
| 4,929,469 A | 5/1990 | Kimura et al. | |
| 5,766,687 A | 6/1998 | Rappoport | |
| 5,997,953 A | 12/1999 | Rappoport | |
| 6,303,683 B1 | 10/2001 | Figovsky | |
| 6,482,894 B1 | 11/2002 | Chang et al. | |
| 7,005,483 B2 | 2/2006 | Chang et al. | |
| 2002/0042468 A1* | 4/2002 | Choi et al. | 524/494 |
| 2004/0053055 A1* | 3/2004 | Robinson et al. | 428/413 |

OTHER PUBLICATIONS

Elastomer-Modified Vinyl Ester Resins: Impact Fracture and Fatigue Resistance, A.R. Siebert et al., Toughened Plastics II, Advances in Chemistry, vol. 252, May 5, 1996, pp. 151-160.*
O.L. Figovsky et. al., entitled "Rubber matrix as the base for preparation of new class of effective corrosion-resistant composites for building"—Cautons, *Scientific Israel—Technological Advantage*, V. 1. No. 2. pp. 53-58.
Y.N. Pushkarev and O.L. Figovsky, Protective ebonite coatings on the base of oligobutadienes, *Anti-Corrosion Methods and Materials*, V. 46, No. 4, 1999, pp. 261-267.
O.L. Figovsky and N.B. Blank, Liquid Ebonite Mixtures for Anticorrosive Coverings, *International Conference on Corrosion in Natural and Industrial Environments: Problems and Solutions, sponsored by Nace International Italia Section*, Grado, Italy, 1995, pp. 593-596.

* cited by examiner

*Primary Examiner* — Mark Eashoo
*Assistant Examiner* — Angela C Scott
(74) *Attorney, Agent, or Firm* — Hayes and Boone, LLP; Pavel I. Pogodin

(57) ABSTRACT

A synthetic-rubber-based composition that consists of a low-molecular-weight rubber selected from polybutadiene comprising about 75% to about 92% cis-1,4 units, sulfur, a vulcanization accelerator, and an active filler wherein the sulfur, accelerator, and active filler are each present in the form of powder having a particular particle-size range. Additionally, this composition may be used to form coatings and rubber concretes.

38 Claims, No Drawings

LIQUID SOLVENTLESS SYNTHETIC-RUBBER-BASED COMPOSITION

FIELD OF THE INVENTION

The present invention relates to the field of chemistry and, more specifically, to a synthetic-rubber-based ebonite composition that may be used to form protective coatings such as anticorrosive coatings or chemically resistant rubber concrete. The proposed liquid composition can be combined with various organic and inorganic fillers and has improved properties and decreased cost as compared to known compositions. The invention also relates to a method of preparing the proposed composition.

BACKGROUND OF THE INVENTION

Liquid ebonite mixtures (LEM) are well known in the art. A liquid ebonite mixture, noted for its excellent abrasion and chemical resistance, is ideally suited for coatings such as monolithic thick-layer coatings. LEM may be used to coat small and intricately shaped articles such as (1) centrifuge rotors for filtration processes and the wheels of pumps and fans, (2) inner surfaces of pipelines, fittings, etc., having small diameters, i.e., less than 32 mm, (3) perforated elements such as screens and mesh, (4) very intricate surface parts, e.g., membranes, (5) parts of chemical apparatuses, reactor vessels, and complex air ducts up to 500 mm in diameter, such as those with joining lips, and (6) galvanic or electrolysis baths and their components. Coating with LEM eliminates the need for an additional glue layer and provides adhesion strength to steel up to 11 MPa in tear-apart tests.

U.S. Pat. No. 4,195,009 issued to Zimmermann in 1980 discloses coating systems based on the use of liquid rubber. However, liquid rubber must be present in the form of hydroxy-terminated rubber, e.g., hydroxy-terminated polybutadiene, which then reacts with a polyether triol and an isocyanate component in the presence of a mercury catalyst, carbon black, low oil-absorbency silica, suspending agent for the latter, lecithin, and molecular sieve desiccant.

U.S. Pat. No. 4,929,469 issued to Kimura, et al., in 1990 discloses a UV-curable surface-protective coating comprising a liquid diene rubber of molecular weight from 1,000 to 10,000 and having one or more hydroxyl groups. Additionally, a diisocyanate component, a diol, and an ethylenically unsaturated monomer having at least one hydroxy group must be present, and the composition is then screen printed and cured by UV radiation to form a coating that is easily peeled from a printed circuit board after plating and soldering. Therefore, the coating systems disclosed in these references are based on polyurethane chemistry and not on rubber vulcanization.

A liquid ebonite mixture composition is disclosed in U.S. Pat. No. 6,303,683 issued to Figovsky in 2001. The composition contains high-molecular-weight rubber (in an amount of up to 4 parts by weight of the number-average molecular weight low-molecular-weight rubber) used for increasing viscosity of the liquid ebonite mixture and thus for preventing problems of sagging. Unfortunately, the high viscosity of such compositions makes handling and inspection of the coating before vulcanization impractical.

Rappoport has disclosed a liquid rubber-based ebonite coating in U.S. Pat. No. 5,766,687 issued in 1998 and U.S. Pat. No. 5,997,953 issued in 1999. Compositions disclosed in these prior art patents contain epoxidized liquid rubber, amines, sulfur, accelerators, and fillers. However, backbone epoxy groups and amines react with difficulty, and therefore the structure of the polymer network is subject to breakage.

Two component mixtures of unsaturated liquid polymers, sulfur, accelerators, and fillers are disclosed by Chang, et al, in U.S. Pat. No. 6,482,894 and by Betts, III, et al, in U.S. Pat. No. 6,486,259, both issued in 2002. One such mixture of unsaturated liquid polymers includes terminal isocyanate groups, thereby increasing handling difficulty and environmental pollution.

The blending of an epoxy coating with an ebonite coating in a mix ratio of 95/5 to 5/95 has been disclosed by Chang, et al, in U.S. Pat. No. 7,005,483 issued in 2006. The epoxy part of the composition includes an epoxy resin of a non-rubber nature and an epoxy curing agent. The ebonite part of the composition includes liquid rubber, wherein said liquid rubber comprises two terminal reactive functional groups, a sulfur vulcanization agent, a vulcanization accelerator, and a vulcanization activator. Such composition is a multicomponent mixture and is inconvenient to handle.

The article by Y. N. Pushkarev and O. L. Figovsky, entitled "Protective ebonite coatings on the base of oligobutadienes" published in *Journal Anti-Corrosion Methods and Materials*, V. 46, No. 4, 1999, pp. 261-267, describes the results obtained from experimental studies on vulcanization processes conducted by Polymate Ltd. (Israel). It has been found that the most effective bonding material for non-solution compositions is an ebonite coating which can be applied onto prepared surfaces by conventional methods used in lacquer-paint coating technology.

The article by O. L. Figovsky and N. B. Blank, entitled "Liquid Ebonite Mixtures for Anticorrosive Coverings", published in *International Conference on Corrosion In Natural and Industrial Environments: Problems and Solutions*, sponsored by NACE International Italia Section, Grado, Italy, 1995, pp. 593-596, described new protective coatings made from ebonite mixtures based on linear low-molecular polybutadiene rubber. These coatings demonstrated chemical resistance to aggressive media.

The article by O. L. Figovsky et. al., entitled "Rubber matrix as the base for preparation of new class of effective corrosion-resistant composites for building—Cautons", published in *Scientific Israel—Technological Advantage*, V. 1. No. 2. pp. 53-58, describes rubber as a matrix for a polymer concrete with high chemical resistance. The authors have found the most optimal matrix named rubber concrete based on four different type of liquid low-molecular-weight polybutadienes.

However, the aforementioned various known compositions possess a number of disadvantages. For example, they require the use of a multi-component liquid ebonite that needs premixing and cannot provide coating of sufficiently high physical and mechanical properties. Further more, the assortment of organic and inorganic and inorganic fillers and aggregates with which the known liquid compositions can be combined is limited. Some of the known compositions form binders that contain volatile styrene monomers the use of which is undesirable. Furthermore, although the protective coatings prepared from the above-described liquid compositions possess chemical resistance to aggressive media, this property is still insufficient with regard to some acids and alkalis. In addition, better adhesion is required for binding to steel reinforcement components typically used in reinforced structural concrete.

OBJECT AND SUMMARY OF THE INVENTION

It is an object of the present invention to overcome the shortcomings of aforementioned various compositions of the prior art and to provide a single-component liquid ebonite protective coating that does not require premixing and that possesses excellent physical and mechanical properties. It is another object to decrease the cost of the composition and thus to expand the range of use. Another object is to provide a liquid composition of the aforementioned type that can be combined with a variety of organic and inorganic fillers and aggregates. It is another object to provide a liquid ebonite composition of the aforementioned type that is ideally suited for use as a binder in pharmaceutical formulations and in rubber concrete. A further object is to provide a liquid composition of the aforementioned type as a binder that is free of volatile styrene monomers and thus to avoid disadvantages of the polymers that contain the volatile styrene monomers conventionally used in concrete formulations. It is an additional object to provide a liquid composition to form hydrolysis-resistant liquid ebonite binders that allow preparation of rubber concrete with resistance to high amounts of acid and alkali, excellent strength, and excellent adhesion to the steel reinforcement components typically found in reinforced structural concrete.

According to one aspect of the invention, the proposed solventless synthetic-rubber-based composition comprises: a low-molecular-weight-rubber selected from polybutadiene comprising from about 75% to about 92% cis-1,4 units; an epoxy-terminated low number-average molecular weight rubber comprising butadiene-acrylonitrile copolymer with not less than 3 epoxy terminal groups per molecule, wherein the epoxy-terminated low number-average molecular weight rubber is present in an amount of about 2.0 parts to about 4.5 parts by weight for 100 parts of low number-average molecular weight rubber; sulfur; a vulcanization accelerator; and an active filler, wherein the sulfur, accelerator, and active filler are present in the form of a powder with a particle size of about 5 μm to about 85 μm.

Preferably, the filler contained in the composition should comprise about 20 to about 50 parts by weight of sulfur, about 2.5 to about 30 parts by weight of accelerator, and about 14 to about 30 parts by weight of active filler per 100 parts by weight of low-molecular-weight rubber. Preferably, the sulfur, accelerator, and active filler are present in the form of a powder with a particle size from about 5 μm to about 75 μm and, more preferably, from about 15 μm to about 50 μm. If desired, the composition may include at least one activator.

The composition may be vulcanized at a temperature greater than or equal to about 80° C. Preferably, heating to and cooling down from the vulcanization temperature are conducted at a rate of not more than about 1° C. per minute.

According to another aspect of the present invention, the composition is intended for forming a substrate coating. Preferably, the coated substrate is carbon steel, stainless steel, aluminum, aluminum alloy, glass, wood, titanium, titanium alloy, concrete, reinforced concrete, plastic, or reinforced plastic.

The coating may be vulcanized at a temperature greater than or equal to about 80° C. Preferably, heating to and cooling down from the vulcanization temperature is conducted at a rate of not more than about 1° C. per minute. Preferably, the vulcanized coating has a thickness of about 0.3 mm to about 4.5 mm.

According to another aspect, the present invention relates to a rubber concrete composition comprising: a low-molecular-weight rubber selected from polybutadiene comprising about 75% to about 92% cis-1,4 units, epoxy-terminated low number-average molecular weight rubber comprising butadiene-acrylonitrile copolymer with not less than 3 epoxy terminal groups per molecule, said epoxy-terminated low number-average molecular weight rubber being present in an amount of about 2.0 to a about 4.5 parts by weight for 100 parts by weight of low number-average molecular weight rubber; sulfur; a vulcanization accelerator, an active filler, and a fine aggregate, wherein the sulfur and the accelerator are present in the form of a powder with a particle size of about 5 μm to about 85 μm and wherein the active filler is present in the form of a powder and essentially consists of at least one first active filler with a particle size of about 5 μm to 85 μm and at least one second active filler with a particle size greater than 85 μm to about 120 μm.

The active filler of the rubber concrete may be selected from carbon black, silica, titanium dioxide, bismuth oxide, fly ash, and mixtures thereof. Preferably, the first active filler is fly ash, and the second active filler is carbon black.

Generally, from about 6 to about 15 parts by weight of the first active filler and from about 10 to about 30 parts by weight of the second active filler are present per 100 parts by weight of low-molecular-weight rubber. Typically, from about 25 wt. % to about 60 wt. % of the active filler is present as the first active filler and from about 75 wt. % to about 40 wt. % of the active filler is present as the second active filler.

Preferably, the fine aggregate essentially consists of sand with a particle size of about 0.14 mm to about 5 mm. The rubber concrete may also include at least one coarse aggregate. Preferably, the coarse aggregate is selected from gravel and mineral chips and has a grain size greater than 5 mm to about 70 mm.

DETAILED DESCRIPTION OF THE INVENTION

The liquid ebonite composition of the present invention is based on the use of a liquid rubber material. Such liquid rubber material may be hardened or cured through reaction of its double bonds initiated by curing an agent such as sulfur. Epoxy-terminated low number-average molecular weight rubber comprising butadiene-acrylonitrile copolymer with not less than 3 epoxy terminal groups per molecule may be hardened or cured similarly. At the same time, plural terminal epoxy groups lead to improvement of adhesion and abrasion properties and also improve environmental conditions by reaction with hazardous vulcanization pollution such as hydrogen sulfide.

The curing agent may also comprise vulcanizing agents, accelerators, vulcanization activators, and special additives. The principal curing agent is elemental sulfur. Because of the presence of polysulfide bonds, vulcanizates obtained using sulfur are characterized by high strength, endurance under conditions of repeated deformation, and high resistance to aging.

Curing accelerators are used for increasing velocity of chemical reactions between sulfur and rubber, as well as for decreasing vulcanization temperature. For example, an acceptable curing velocity is reached using the accelerator combination of Tiuram-D and Tsimat. To increase effectiveness of the accelerator, inorganic and organic activators may also be included in the formulation. In particular, zinc oxide may be used as an activator. Special additives such as plasticizers (for decreasing mixture viscosity and/or internal stress and increasing strength and impact load), antioxidants, and absorbents may also be introduced into the matrix composition.

Unlike conventional ebonite, which is based on natural rubber, i.e., high-molecular weight substantially cis-1,4-polyisoprene, the liquid rubber of the present invention is formed from polybutadiene comprising about 75% to about 92% cis-1,4.

Molecular weight of the liquid rubber component must be low enough so that the rubber is liquid at 20° C. Therefore, this component is also referred to herein as a low-molecular-weight rubber component. Preferably, the number-average molecular weight of the low-molecular-weight liquid rubber is about 1,500 g/mol to about 30,000 g/mol. Liquid rubber typically has a Brookfield viscosity of about 0.7 Pa·s to about 300 Pa·s at 20° C. and preferably from about 0.7 Pa·s to about 30.0 Pa·s at 20° C.

Suitable commercially available liquid rubber materials which may be used in the liquid ebonite compositions of the present invention include but are not limited to low-molecular-weight polybutadiene resins Polyoil® 110 and 130, which are available from Evonik (formerly Degussa, Germany) and SKDN-N mark 1, which is available from Efremov-Kautschuk GmbH (Frankfurt, Germany).

As well known to those skilled in the field of rubber vulcanization, sulfur may be used to vulcanize or cross-link polymeric chains containing carbon-carbon double bonds, e.g., polybutadiene.

To form the highly cross-linked ebonite-like composition of the present invention, a larger amount of sulfur is generally present than is used to form so-called soft-cured rubbers, wherein only about 10 parts of sulfur per 100 parts of rubber are used. Generally, from about 20 to about 50 parts by weight of sulfur are present per 100 parts by weight of low-molecular-weight rubber. Preferably, about 25 parts to about 50 parts by weight of sulfur are present per 100 parts by weight of low-molecular-weight rubber and, more preferably, about 27 to about 35 parts by weight of sulfur is present.

Suitable commercially available sulfur which may be used in the liquid ebonite composition of the present invention includes but is not limited to Akrochem Sulfur (available from Akrochem Corp.); Code 104 Rubbermaker's, Code 209 Oil Treated RM Sulfur and Code 338 Superfine RM Sulfur (Harwick Chemical Corp.); Crystex HS Insoluble Sulfur and Crystex 90 OT-20 Insoluble Sulfur (Akzo Chemicals, Inc.); Devil AA Sulfur and Mule Brand Sulfur (C. P. Hall, Co.); and Rubber Markets Sulfur and Spider Brand Sulfur (Taber, Inc.). The following commercially available sulfurs are preferably used in LEM compositions of the present invention: Akrochem Sulfur, Code 104 Rubbermaker's, Code 338 Superfine RM Sulfur, Mule Brand Sulfur, and Spider Brand Sulfur.

As is well known to those skilled in the rubber vulcanization art, accelerators may be used along with sulfur in rubber vulcanization to increase and/or regulate the rate of vulcanization. Therefore, at least one accelerator is also present in the liquid ebonite composition. Generally, from about 2.5 parts to about 30 parts by weight of the accelerator is present per 100 parts by weight of low-molecular-weight rubber. Preferably, the accelerator should be present in an amount of about 3.0 parts to about 25 parts by weight, and most preferably in the amount of 3.5 parts to about 22 parts by weight per 100 parts by weight of low-molecular-weight rubber.

Suitable commercially available accelerators which may be used in the liquid ebonite composition of the present invention include but are not limited to aldehyde amines, e.g., hexamethylene tetraamine (HMT) and ethylidene aniline (EA); guanidines, e.g., diphenyl guanidine (DPG), triphenyl guanidine (TPG), and di-o-tolylguanidine (DOTG); thiazoles, e.g., mercaptobenzthiazole (MBT), sodium salt of MBT and dibenzthiazyl disulfide (MBTS); sulfenamides, e.g., N-cyclohexylbenzthiazylsulfenamide (CBS) and N-oxydiethylbenzthiazylsulfenamide (NOBS); dithiocarbamates, e.g., piperidine pentamethylenedithiocarbama-te (PPD), zinc diethyldithiocarbamate (ZDC, ZDEC), sodium diethyldithiocarbamate (SDC) and zinc ethylphenyldithiocarbamate; thiuram sulfides, e.g., tetramethylthiuram disulfide (TMT, TMTD), tetraethylthiuram disulfide (TET, TETD), tetramethylthiuram monosulfide (TMTM) and dipentamethylenethiuram tetrasulfide (DPTS); xanthates, e.g., zinc isopropyl xanthate (ZIX), sodium isopropyl xanthate (SIX) and zinc butyl xanthate (ZBX); and morpholine disulfides, e.g., bismorpholine disulfide. Preferably, at least one of the following commercially available accelerators is used in the LEM composition of the present invention: 2-mercaptobenzothiazole (available as Akrochem MBT from Akrochem Co.; Captax (T. R. Vanderbilt Company Inc.); Captax, Elastochem, Inc.; THIFAX (MBT), Elastochem, Inc.; EKALAND MBT, Sovereign Chemical Co.; MBT, Uniroyal Chemical Company Inc.; PERKACIT MBT, Akzo Chemicals (Netherlands); and VULCACIT MERCAPTO, Lanxess (Germany)), zinc 2-mercaptobenzothiazolate (available as EKALAND ZMBT from Sovereign Chemical Co.), zinc dimethyldithiocarbamate (available as Akrochem MZ from Akrochem Co.; METHYL CUMATE, T. R. Vanderbilt Company Inc.; and METHYL ZIMATE, Elastochem, Inc.), zinc dimethylthiocarbamate (available as METHASAN from Harwick Chemical Corp.), N,N-dimethylcyclohexylammonium dibutyldithiocarbamate (available as Akrochem Accelerators EZ from Akrochem Co.), tetramethylthiuram disulfide (available as Akrochem TMTD, Akrochem Co; TUEX, Uniroyal Chemical Company Inc.; and PERKACIT DPG, Akzo Chemicals), tetraethylthiuram disulfide (available as Akrochem TETD from Akrochem Co.), a mixture of tetramethylthiuram disulfide and tetraethylthiuram disulfide (available as THIURAM ME from Arrow Polychem, Inc.), tetrabutylthiuram disulfide (available as BUTYL TUADS DLC-A and ROFAX from T. R. Vanderbilt Company Inc.), benzothiazyl disulfide (available as MBTS from Uniroyal Chemical Company Inc. and Akrochem MBTS from Akrochem Co.), tetramethylthiuram monosulfide (available as Akrochem TMTM from Akrochem Co. and PERKACIT TMTM(G) from Akzo Chemicals), tetracarbonyl sulfenamide (available as Akrochem Cure-Rite 18 from Akrochem Co.; CURE-RITE 18, T. R. Vanderbilt Company Inc.; and CURE-RITE 18, Elastochem, Inc.), 4,4'-dithiomorpholine (available as EKALAND DTDM from Sovereign Chemical Co. and Akrochem Accelerators "R" from Akrochem Co.), 2-benzothiazyl-N-morpholine disulfide (available as Akrochem Accelerators MF from Akrochem Co.), N,N-diphenyl morpholine (available as Akrochem Accelerators THIO NO. 1 from Akrochem Co.), diphenylguanidine (available as DPG Vulcanization Accelerator from Monsanto and EKALAND DPG from Sovereign Chemical Co.), dipentamethyl thiourea (available as Akrochem DPTT from Akrochem Co.), magnesium oxide (available as MAGCHEM 125 from Martin Marietta; ELASTOMAG 170 Powder, Morton International; STARMAG CX-50 and CX-150, Merrand International Co.; and MAGLITE D, Marine Magnesium), and zinc oxide (available as Grade 318 and 185 American Process from Eagle Zinc Co.).

In the present invention, the matrix of a composite material consists of rubber and other vulcanization-assisting compounds, which are described above in detail. Composites are generally described as a macroscopic combination of two or more components. One of the components of the composite is typically a fiber or a particulate, although fibers and particulates may both be present, and is used to reinforce the composite. Therefore, this component is referred to herein as a reinforcement component. The other component of the composite typically surrounds the fiber or particulate and is generally referred to as a matrix. In the composites of the present invention, the reinforcement component may comprise at least one active filler.

The highly chemically resistant rubber coating disclosed herein is provided by adding at least one reinforcement component comprising a reactive powdered substance, also known as an active filler, to the liquid rubber, thereby creating a two-phase composite structure. Such a structure is also known as a particulate-reinforced composite, wherein the particulate comprises the active filler and the matrix comprises the low-molecular-weight rubber and high-molecular-weight rubber.

Without limitation to any particular theory, it is believed that as the active filler interacts with water or with another aggressive medium that diffuses into the composite, hydrate complexes, also known as crystal hydrates, form into the defects, e.g., micropores and/or microcracks. The above active fillers act to "repair" these defects and thereby to increase the strength of the composite. Additionally, active fillers are thought to function as barriers that inhibit further penetration of aggressive media. Moreover, as crystal hydrates are formed, the volume and specific surface area of the active filler increase. As a direct result of the increased specific surface area of the active filler, adhesion between the reinforcement component and the rubber is believed to become even stronger.

As a result of the interaction with an aggressive medium, such as water, aqueous acid, or aqueous alkali, the active filler reinforcement component is believed to be transformed to a new phase comprising a high-strength hydrate complex. The volume of the active filler becomes greater than the volume of the initial filler as aggressive medium penetration causes hydrate complex formation, resulting in decreased free volume of the composite.

In practice, exposure to aqueous solutions of chlorine or nitric acid during the filler's conversion leads to formation of a high-strength protective layer with a low-diffusion coefficient. This protective layer provides a barrier to further penetration of water and aggressive media.

Typical active fillers include but are not limited to carbon black, silica, titanium dioxide, bismuth oxide, fly ash, and mixtures thereof. Generally, about 14 parts to about 30 parts by weight, preferably about 16 parts to about 26 parts by weight, and most preferably about 18 parts to about 23 parts by weight of active filler is present per 100 parts by weight of a low-molecular-weight rubber.

Suitable commercially available carbon black active fillers which may be used in the LEM composition of the present invention include but are not limited to A-BLACK, Polymer Valley Chemicals; N110, N135, N231, Sid Richardson; HUBER S-212, N231, N234, S-315, N330, N650, N660, ARO-60(N754), N990, N762, J. M. Huber; and FURNEX N-754, N-762, N-787, Columbian Chemicals. Suitable commercially available non-carbon black active fillers which may be used in the LEM composition of the present invention include but are not limited to No. 8-C Calcined Clay, Harwick Chemical Corp.; AKROCHEM EW 150 clay, HC 100 Clay, Akrochem Co.; BARCO B, Barium & Chemicals, Inc.; bismuth oxide, Merck GmbH, Germany; HI-SI ABS, 233, SILENE 732D, 532EP, PPG Industries; POLARLINK 15R, 45R, PV-S 45, Polymer Valley Chemicals; TIEBRIGHT, Malvern Minerals; ULTRASIL VN 3 SP, Evonik, Germany; and UNITANE titanium dioxide, Kemira A Y, Finland.

Preferably, the following commercially available active fillers are used in the liquid ebonite composition of the present invention: ARQ-60(N754) and Huber N762 carbon black, J. M. Huber; FURNEX N663 and N-762 carbon black, Columbian Chemicals; bismuth oxide, Merck GmbH, Germany; SILENE 732D and 532EP silica, PPG Industries; ULTRASIL VN3 SP silica, Evonik, and UNITANE titanium dioxide, Kemira A Y.

It is critical to the success of the liquid ebonite composition of the present invention that the sulfur, as at least one active filler, and the accelerator or accelerators are each present in the form of ultradispersive powder. Without limitation to any particular theory, such powder is believed to be required for successful implementation of the invention by promoting a homogeneous vulcanization reaction and/or a homogeneous distribution of the active filler throughout the liquid ebonite composition.

Generally, with the exception of the rubber concrete comprising liquid ebonite composition, which will be discussed in detail below, the sulfur and each active filler and accelerator present in the composition have a mean particle size of about 5 μm to about 85 μm. Preferably, the sulfur and each active filler and accelerator present has a mean particle size of about 15 μm to about 75 μm. More preferably, the sulfur and each active filler and accelerator present in the composition have a mean particle size of about 15 μm to about 50 μm. Mean particle size is determined by methods well known to those with ordinary skills in the field, methods such as optical microscopy. When the particles are substantially spherical, the mean particle size is equivalent to the mean particle diameter. Technical products, many of which have broad particle-size distributions, can be sieved by methods well known to those in the field in order to narrow the particle-size distribution so that it falls within the desirable limits as set forth above.

Although not an indispensable component of the liquid ebonite composition of the present invention, the activator may also be incorporated into the liquid ebonite composition to modify the rate of vulcanization, as is well known to those of ordinary skills in the field of vulcanization. Generally, the activator should be used in an amount of about 0.5 part to about 4.3 parts by weight, preferably from about 1.0 part to about 3.0 parts by weight, and most preferably from 1.4 parts to about 2.2 parts by weight for 100 parts by weight of low-molecular-weight rubber.

Suitable commercially available activators which may be used in the liquid ebonite compositions of the present invention include but are not limited to CALCIUM HYDROXIDE HP, C. P. Hall; D-B-A, Uniroyal Chemical; ELASTOMAG 170 Powder, Morton International; HYSTENE 3022, 5016, 9512, INDUSTENE M, 105, 4516, 9018, Hunko Chemical; NATRO CEL 5050-A and 35, Natrochem; RED LEAD #97, Akrochem; STARMAG CX-50, CX-150 and U, Merrand International Co.; LUPERCO 101-XL, 130-XL, 331-XL, AST, ATC, 231, NATRO CEL TATM, 5050 and STAN MAG 112, Harwick Chemical Co.; STRUCTOL FA 541, ZEH-DL and SYNPRO-WARAE R-11, Structol Co. of America; and ZINOX-GRADE 350, American Chemet.

Preferable commercially available activators which may be used in the liquid ebonite composition of the present invention include but are not limited to a dibenzylaminemonobenzylamine blend (available as D-B-A from Uniroyal Chemical), 2,5-dimethyl-2,5-di(t-butylperoxy)hexane-3 on an inert filler (available as LUPERSOL 130-XL from Harwick Chemical Co.), triallyl trimellitate-silicate blend (available as NATRO CEL TATM from Harwick Chemical Co.), a mixture of zinc salts of aliphatic and aromatic carboxylic acids bound to active inorganic filler (available as STRUCTOL FA 541 from Structol), magnesium oxide (available as MAGCHEM 125 from Martin Marietta; ELASTOMAG 170 Powder, Morton International; STARMAG CX-50 and CX-150, Merrand International Co.; and MAGLITE D, Marine Magnesium), $Pb_2O_3$ (available as RED LEAD #97 from Akrochem) and mixtures thereof.

Furthermore, any or all of the following optional materials may be present in the compositions of the invention, if desired: antioxidants, antiozonants, inhibitors, UV-light absorbers and heat sensitizers;
antiblocking agents, antiflex-cracking agents, antislip agents, antistatic agents and flame retardants; chemical and heat stabilizers; fungicides and germicides; processing aids such as homogenizing agents, peptizers, plasticizers, softeners, dispersing agents and tackifiers; and solvents.

Preferably, when any of the above-mentioned additional materials are present, each is present in the range of about 0.02 part to about 3.8 parts by weight and more preferably from about 0.03 to about 3.2 parts by weight per 100 parts by weight of low-molecular-weight rubber. If desired, the liquid ebonite composition can also comprise further optional components such as pigments, dyes, microspheres, reinforcing agents such as fibers in the form of filaments, staples, mats, etc., thixotropic agents, coupling agents, catalysts and/or leveling agents. Examples of possible components are those described in *Ullmann's Encyclopedia of Industrial Chemistry,* 5th Edition, Vol. A18, pp. 429-471, VCH Verlagsgesellschaft, Weinheim 1991, which is incorporated herein by reference.

Suitable commercially available additional materials which may be used in the liquid ebonite of the present invention include but are not limited to AKROCHEM ANTIOXIDANT 33, 36, 58, 60, NIBUD, PEPTIZER 9344, PTP and AKSOSORB, Akrochem; CHIMASSORB 944 FL and TINUVIN 622 LD, Ciba-Geigy A G, Switzerland; STABLWHITE POWDER (49-454), SUPRMIX PEPTIZER 966, 7010, SUPRMIX PLASTHALL 4141 and 226, C. P. Hall; TOPANOL 205, CA and CA-SF, Zeneca Stabilizers; ULTRANOX 236, 257 and 626, GE Specialty Chemicals; SUBLIMED BLUE LEAD, Eagle-Picher; MARK TT, WS and XI, Argus Chemical; and GUM 150, NATRO-CEL 97-A, 1312-DLC-A, BCA, LM and PLASTONE 20 A, Harwick Chemical Co.

The following non-limiting method is suitable for forming the liquid ebonite composition of the invention. However, certain modifications in conditions, apparatus, etc., may be undertaken without departing from the scope and spirit of the present invention, as those of ordinary skill in the art will recognize. A copolymer of isobutylene and isoprene, generally present in the form of small-size chunks (from about 5 mm to about 8 mm on a side) is dissolved in linear polymer or copolymer polybutadiene-type liquid rubber for 2 to 3 hours at a temperature of about 20° C. to about 3° C. The butyl rubber may be swollen with a solvent, typically an aliphatic hydrocarbon, to speed its dissolution in the liquid rubber. It is preferred that this rubber solution be then mixed with sulfur, present in pulverulent form (particle size from about 25 µm to about 65 µm), in a mixer suitable for use with low-viscosity liquids at a rotation speed of about 25 rpm to about 45 rpm for 20 to 40 minutes at a temperature of about 15° C. to about 40° C. After mixing, the other components of the composition, e.g., filler(s), accelerator(s), etc., are added, and the batch is then mixed for an additional period of about 15 to about 25 minutes at a temperature of about 15° C. to about 40° C. Mixing is followed by grinding in an appropriate disk or roll color mill, e.g., a paint-rolling grinder, for a period of about 18 minutes to about 25 minutes at a temperature of about 15° C. to about 30° C. Such compositions may be vulcanized, e.g., under the conditions described in detail below for the vulcanization of coatings comprising LEM. For example, such compositions are typically vulcanized at a temperature of about 80° C. to 150° C., preferably about 110° C. to 25° C., for 6 to 20 hours, preferably 8 to 12 hours, by using only dry hot air at a pressure not more than about 4.5 atm, preferably about 0.5 atm to about 3.7 atm.

According to another aspect of the present invention, a protective coating comprising liquid ebonite composition is formed on a substrate. Preferably, the coating on the substrate comprises a vulcanized liquid ebonite composition. A wide variety of substrates may be coated with the liquid ebonite composition formulations of the present invention. Suitable substrates include but are not limited to carbon steel, stainless steel, aluminum and aluminum alloys, glass, wood, titanium and titanium alloys, concrete, including reinforced concrete, and plastic, including reinforced plastic. Preferably, substrates coated with LEM formulations of the present invention include carbon steel, stainless steel, reinforced concrete, and aluminum alloys. More preferably, substrates coated with the liquid ebonite composition formulations of the present invention include carbon steel and aluminum alloys.

The liquid ebonite composition may be coated onto a substrate, e.g., a cleaned steel plate. The coating is prepared as previously described. Typically, the coating layer is applied so that the vulcanized coating has a thickness of about 0.3 mm to about 4.5 mm. Preferably, the vulcanized coating has a thickness of about 0.5 mm to about 3.0 mm and, more preferably, from about 0.7 mm to about 2.2 mm.

The coating is then vulcanized at a temperature of about 80° C. to 150° C., preferably 110° C. to about 125° C., for 6 to 20 hours, preferably for about 8 to 12 hours, by using only dry hot air at a pressure not more than about 4.5 atm, preferably about 0.5 atm to 3.7 atm. As is well known to those of ordinary skill in the field of vulcanization, the temperature and time of vulcanization are inversely related, i.e., higher vulcanization temperatures generally require shorter vulcanization durations, and vice versa. For example, at 150° C., vulcanization for about 6 hours is usually sufficient to substantially vulcanize the compositions of the invention. However, at 125° C., the durations of vulcanization is generally longer, typically about 15 hrs. At even lower vulcanization temperatures, e.g., 110° C., about 20 hours may be required for vulcanization. Moreover, the presence of accelerators, activators, and other additives also influence duration and/or temperature required for vulcanization. Therefore, the above-described conditions for vulcanization may be adjusted appropriately for the particular mixture being vulcanized, as is well known to those skilled in the field of vulcanization.

Also applicable to liquid ebonite compositions is the heating-up of a coating comprising a liquid ebonite composition to the vulcanization temperature and cooling-down from the vulcanization temperature, and this should be conducted at a rate of not more than about 1° C. per minute. If the rate is greater than about 1° C. per minute, the coated film may develop undesirable surface defects, for example, pores may open on the film surface.

Considering that, in practice, vulcanization is not always performed at high temperatures, suitable additive combinations may be used to give satisfactory vulcanization at relatively lower temperatures. For example, acceptable vulcanization velocity may be reached with a combination of TIURAM-D and TSIMAT accelerators and with zinc oxide as an activator. An exemplary formulation comprises 2 parts of TIURAM-D, 2 parts TSIMAT, and 20 parts zinc oxide, all per 100 parts by weight of low-molecular-weight rubber.

According to another aspect of the invention, a rubber binder or rubber concrete is formed from the liquid ebonite composition of the present invention. Such liquid ebonite compositions containing rubber with the consistency of a viscous liquid open up the possibility of processing rubber binder or rubber concrete compositions by means of free molding, i.e., molding that occurs without the need for high pressure.

For the purposes of this application, rubber concrete compositions comprising liquid rubber are separated into the following groups, based on-the type of inclusions present in the matrix:

(1) rubber matrix, which comprises rubber and all other components assisting in vulcanization;
(2) rubber binder, which comprises the rubber matrix and which further comprises at least one finely dispersed filler, i.e., the active filler; and
(3) rubber concrete, which comprises the rubber binder and added aggregate or aggregates that are much coarser than the finely dispersed filler.

Certain combinations of these groups provide a basis for production of rubber mastics and fine- and coarse-grained rubber concrete.

To use the compressive strength of cube samples 4 cm long on each side as a criterion to optimize the rubber matrix composition in such applications is particularly desirable. Furthermore, carrying out experiments according to a statistically designed plan makes it possible to optimize the composition with required accuracy and to considerably reduce the number of experiments required as compared to traditional methods of "passive" experimentation. For example, optimization of the rubber matrix composition has been carried out according to the Kifer-Jonson method.

Generally, for a rubber binder comprising a liquid ebonite composition, each particulate component, e.g., the sulfur and each accelerator present in the composition, has a mean particle size as previously specified, i.e., generally about 5 µm to about 85 µm, preferably about 15 µm to about 75 µm and, more preferably, about 15 µm to about 50 µm. However, each active filler that is present in a rubber concrete formulation may have a somewhat larger mean particle size range from 5 µm to about 120 µm. Preferably, two or more active fillers are present. The first active filler has a particle size range of about 5 µm to 85 µm. Preferably, the first active filler has a particle size range of about 15 µm to 85 µm. The second active filler has a particle size range greater than 85 µm to about 120 µm and, preferably, greater than 85 µm to about 110 µm.

Typical active fillers in the rubber concrete of the invention include but are not limited to carbon black, silica, titanium dioxide, bismuth oxide, fly ash, and mixtures thereof. As is well known to those in the art, fly ash comprises silica as a major component. Fly ash with a specific surface area ($S_{SS}$) of 200 m²/kg has been found to be particularly useful. Specific surface area is measured by means of the BET method. This method and other specific surface area measurement methods well known in the art are described in U.S. Pat. No. 5,580,919.

Typically, about 25 wt. % to about 60 wt. % of the active filler is present as the first active filler and about 75 wt. % to about 40 wt. % is present as the second active filler. Preferably, about 30 wt. % to about 50 wt. % of the active filler is present as the first active filler, and about 70 wt. % to about 50 wt. % is present as the second active filler.

Generally, in a rubber concrete formulation comprising a liquid ebonite composition, about 6 parts to about 15 parts by weight of the first active filler is present per 100 parts by weight of low-molecular-weight rubber. Additionally, about 10 parts to about 30 parts by weight, preferably about 10 parts to about 20 parts by weight of the second active filler is present per 100 parts by weight of the low-molecular-weight rubber.

Additionally, for the preparation of a concrete-type conglomerate composition, various-size aggregates are combined with the rubber binder to form a rubber concrete mixture. Such mixtures can be formed by methods that are well known to those of ordinary skill in the art, e.g., with commercial concrete mixing apparatus. At least one aggregate, i.e., an inorganic or organic filler that is not an active filler, is added to the rubber binder to form rubber concrete.

For the purposes of this application, aggregates are divided into fine aggregate, which has a particle size up to and including 5 mm, and coarse aggregate, which has a particle size greater than 5 mm.

At least one aggregate present in rubber concrete must be a fine aggregate. Such fine aggregates include but are not limited to quartz sand with an $S_{SS}$ of about 100 to about 400 m²/kg. Without limitation to any particular theory, incorporation of fine aggregate into rubber concrete is believed to decrease internal stress, creep, and shrinkage of the rubber composition. Sand with a particle size range from about 0.14 mm to and including 5 mm has been found to be particularly effective as the fine aggregate.

Gravel and a wide variety of mineral chips with grain sizes ranging from greater than 5 mm to about 70 mm have been found to be particularly effective as the coarse aggregate.

Generally, in a rubber concrete formulation comprising a liquid ebonite composition, about 65 parts to about 88 parts by weight of aggregate are present per 100 parts by weight of low-molecular-weight rubber. Preferably, about 70 parts to about 83 parts by weight of aggregate are present per 100 parts by weight of low-molecular-weight rubber.

Rubber binders and rubber concrete containing a fine aggregate, that is, filled rubber compositions, are characterized as heterogeneously dispersed systems with Theological behavior determined by their formulation and structure. Viscosity is believed to be the most important characteristic of such filled compositions. Without limitation to any particular theory, the optimal parameter of a rubber binder and such compositions comprising it is the viscosity dependence upon the concentration of the filler particles present in the composition.

A number of factors contribute to viscosity dependence, including: (1) viscosity for the slipping of particles over liquid phase interlayers, (2) dry friction when particles contact one another, (3) capillary attraction in the menisci formation, (4) interparticle interaction, and (5) hydrodynamics under particle deformation in the liquid. The relative contribution of some or all of these factors predetermines the viscosity of the heterogeneously dispersed system and its rheological behavior.

Three zones are identified in the relationship between dynamic viscosity and the volume of filler. In the first zone, characterized by a "floating" structure in which filler particles are widely separated, Theological behavior is determined essentially by liquid phase viscosity. Viscosity increases moderately with an increase in filler particle concentration. This is thought to arise from a lack of dispersed phase quantity for structuring of the system.

As the filler content continues to increase, the second zone is entered. In this zone, viscosity increases more intensively with increasing filler content than in the first zone since filler particles make a major contribution to the rheological state of system. Aggregate structures are generated from particles separated by thin liquid films. A composite space structure is thought to form in the second zone in response to the merging of primary aggregates.

In the third zone, a further increase in filler concentration causes an even more drastic rise in viscosity per unit increase in filler concentration than in the second zone. As this takes place, the system's "sensitivity" to the variation in the quantity of dispersed phase is increased. As further filler concentration increases, a deficiency of liquid phase results in breaks in the film structure of the matrix and in the formation of pores.

Furthermore, with increased specific surface area at a particular volume concentration, the viscosity increases. At all specific surface areas and with a rise in filler content, viscosity increases steeply.

After it is shaped and/or molded, the rubber concrete is vulcanized at a temperature of about 110° C. to about 150° C., preferably about 120° C. to about 125° C., for about 6 hours to about 20 hours, preferably about 8 hours to about 12 hours, by using only dry hot air at a pressure not more than about 4.5 atm, preferably about 0.5 atm to about 3.7 atm. The heating-up to the vulcanization temperature and cooling-down from the vulcanization temperature should be conducted at a rate of not more than about 1° C. per minute. If the rate is greater than about 1° C. per minute, the rubber concrete may develop undesirable defects.

A distinguishing characteristic of filled rubber compositions, such as a rubber binder or rubber concrete comprising a liquid ebonite composition, is the extreme change in strength with an increase of filler volume and surface area. Therefore, optimizing the filler content is recommended to achieve maximum strength. For example, a series of samples 40.times.40.times.160 mm may be prepared to study the quantity, specific surface area, and filler-type influence on the rubber binder strength. Without limitation to any particular theory, it is believed that for every value of filler specific surface area, there is an optimal particle concentration and strength level. For example, for quartz filler, maximum strength of the rubber binder may be achieved at a specific surface area of about 300 m$^2$/kg and a filler concentration of about 30%.

It should be noted that as particle-size dispersity increases (at a constant filler concentration), binder strength decreases. Without limitation to any particular theory, it is believed that this decrease in strength is due to deterioration by wetting conditions of particles and, as a result, the particles aggregate into larger-size capsules that reduce the binder's strength.

Chemical resistance is a critical criterion if liquid ebonite compositions and coatings and rubber concretes comprising LEM are to be used successfully as structural materials in aggressive media. Therefore, it is important to make an assessment of the vulnerability of these materials to chemical attack.

The criterion for chemical resistance is a strength test after immersion in a chemical solution. Samples are immersed in aggressive media for certain periods of time and thereafter are tested under tensile or compressive loads. In addition, control samples that are not immersed in the aggressive chemical media are also tested. The coefficient of chemical resistance $K_{CR}$ is defined as: $K_{CR}=\sigma_\tau/\sigma_v$, where $\sigma_\tau$ and $\sigma_v$ are, respectively, the strength of a sample exposed in an aggressive medium for T days and an unexposed control.

EXAMPLES

The following examples of liquid ebonite mixtures and also coatings and rubber concretes formed therefrom in accordance with the present invention are given to illustrate the present invention. However, it is to be understood that the examples are for illustrative purposes only, and in no manner is the present invention limited to specific disclosures therein.

Example 1

Preparing Liquid Ebonite Compositions

Four sample compositions of the invention were prepared by the method described below. The components formulated into each sample and the amounts used are shown in Table 1.

Isobutylene-isoprene rubber, in the form of small chunks (5 to 8 mm) and swollen by n-heptane, was dissolved in linear or copolymer polybutadiene liquid rubber for 2 to 3 hours at 20 to 35° C. The rubber solution was mixed with sulfur, present in pulverulent form (particle size 25 to 65 μm), in a mixer suitable for use with low-viscosity liquids at a rotation speed of 35 rpm for 30 minutes at 20° C. Other components, i.e., filler(s) and accelerators, were then added, and the batch was mixed for an additional 20 minutes at 20° C. The particle size of each filler or accelerator ranged from 20 to 50 μm with smaller and larger particles being removed by sieving. This was followed by grinding in a paint-rolling grinder for 20 minutes at 20° C.

TABLE 1

Compositions (in parts by weight per 100 parts of liquid rubber)

| | Composition No. | | | |
|---|---|---|---|---|
| | 1 | 2 | 3 | 4 |
| Linear polybutadiene - SKDN-N (Efremov-Kautschuk GmbH) (82% cis-1,4, 25,000 mol. wt.) | 100 | 100 | — | — |
| Linear polybutadiene - POLYOIL ® 110 (Degussa) (75% cis-1,4, 2,000 mol. wt.) | — | — | 100 | — |
| Linear polybutadiene - POLYOIL ® 130 (Degussa) (78% cis-1,4, 5,000 mol. wt.) | — | — | — | 100 |
| Epoxy-terminated butadiene-nitrile rubber KR-207 (Kukdo) (tetrafunctional compound; viscosity 2,500 mPa · s, 25° C.) | 2 | 4.5 | 3 | 4 |
| Sulfur - Code 104 Rubbermaker's (Harwick Chem. Corp.) | 38 | 33 | 32 | 30 |
| Active filler: | | | | |
| Technical carbon black - FURNEX N-754 (Columbian Chemicals) | 21 | — | — | 20 |
| Silica white - SILENE 732D (PPG Industries) | — | 7 | 9 | — |
| Titanium dioxide - UNITANE (Kemira AY) | — | 11 | 10 | — |
| Accelerator: | | | | |
| THIURAM ME (Arrow Polychem, Inc.) | 4.5 | 4.2 | 4.7 | — |
| CAPTAX (R.T. Vanderbilt Co.) | 0.2 | 0.3 | 0.1 | 2.0 |
| Diphenylguanidine - DPG (Monsanto) | 2.0 | 2.2 | 1.8 | 2.0 |
| Zink oxide - MO Brand | 16.0 | 15.0 | 15.5 | — |

The aforementioned epoxy-terminated butadiene-nitrile rubber KR-207 is represented by the following structural formula:

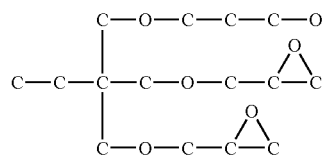 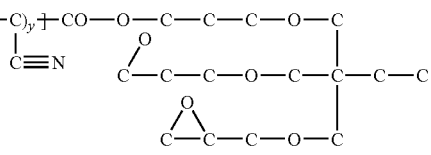

Additionally, certain control samples were also prepared according to the above method. Composition 1C is identical to Composition 1 except that epoxy-terminated butadiene-nitrile rubber is absent. Composition 2C is identical to Composition 1 except that epoxy-terminated butadiene-nitrile rubber is Epon 58034 (Hexion)—bifunctional compound.

Example 2

Preparing Liquid Ebonite Coatings

Liquid ebonite compositions 1-4, prepared according to the method described in Example 1, were used to coat a cleaned steel plate. Each composition formed a coating layer with a thickness of 0.7 to 1.2 mm. The coating was then vulcanized at a temperature of 125° C. for 15 hours by using only dry hot air at a pressure of 3.5 atm. Heating to the vulcanization temperature and cooling-down from the vulcanization temperature were conducted at a rate of not more than 1° C. per minute. These coated steel samples were used to determine tensile adhesion of each coating to the steel substrate according to the method prescribed by ASTM D 897.

For the purposes of tensile testing, the above procedure was modified by substituting a polytetrafluoro-ethylene (PTFE) sheet for the steel so that a free film of each of the 4 liquid ebonite compositions could be obtained by peeling the PTFE from the vulcanized film. The tensile properties, i.e., tensile strength and elongation at break, of each free vulcanized film were determined according to the method prescribed by ASTM D 638. Such samples were also used to determine the coefficient of chemical resistance of each coating by the procedure discussed above in which tensile strength was used to determine $K_{CR}$.

The properties of the four coatings of the invention, samples 5 to 8, are shown in Table 2. The properties of two control coatings, samples 9 and 10, also formed by the above-described method are shown in Table 3.

Example 3

Rubber Concretes and Their Preparation

Rubber concrete mixtures were prepared as follows. Composition 3 from Table 1 was used as the matrix for such concretes except that 7.5 parts by weight zinc oxide based on 100 parts of liquid rubber were present as a pigment, and the active filler (shown in Table 1) was replaced by 18 parts by weight of fly ash based on 100 parts liquid rubber.

TABLE 2

Properties of Vulcanized Liquid Ebonite Coatings

| | Sample No. | | | |
|---|---|---|---|---|
| | 5 | 6 | 7 | 8 |
| | Composition No. | | | |
| | 1 | 2 | 3 | 4 |
| Tensile Strength, MPa | 25.7 | 25.4 | 25.4 | 25.7 |
| Elongation at Break, % | 5.9 | 6.1 | 5.7 | 6.2 |
| Adhesion Strength, MPa | 11.5 | 11.3 | 11.8 | 10.7 |
| $K_{CR}$ after 360 days at 6° C. in: | | | | |
| 35% Aqueous Hydrochloric Acid | 0.86 | 0.88 | 0.88 | 0.87 |
| 50% Aqueous Sulfuric Acid | 0.94 | 0.93 | 0.94 | 0.96 |
| 35% Aqueous Phosphoric Acid | 0.91 | 0.91 | 0.92 | 0.94 |

Zinc oxide, GOST 10262 by the Russian standard and obtained from LNPO Pigment (Saint Petersburg, Russia), had a particle size of 5 to 60 μm. Fly ash was obtained from Nesher Company (Nesher, Israel) and had a particle size of 60 to 110 μm distributed as follows: 8 parts (44.4%) 60 to 85 μm and 10 parts (55.6%)>85 to 110 μm. Before the fly ash was added to the composition, it was pretreated by mixing it with a portion of the liquid rubber (10% of the total in the composition) in a ball mill for 25 minutes at 40° C.

TABLE 3

Properties of Vulcanized Control Coatings

| | Sample No. | |
|---|---|---|
| | 9 | 10 |
| | Composition No. | |
| | 1C | 2C |
| Tensile Strength, MPa | 21.3 | 21.8 |
| Elongation at Break, % | 3.8 | 2.9 |
| Adhesion Strength, MPa | 9.4 | 8.7 |

Rubber concrete mixtures were prepared from the above matrix by adding typical aggregate materials used in the formation of concretes. Here, quartz sand with a particle size of about 0.2 mm to about 3 mm and granite rubble with a particle size of about 7 mm were used in the following amounts (in parts by weight).

TABLE 4

Rubber Concrete Composition

| | Sample No. | |
|---|---|---|
| | 11 | 12 |
| LEM rubber binder* | 100 | 100 |
| Aggregate: | | |
| Quartz sand (fine) | 135 | 135 |
| Granite rubble (coarse) | 690 | 655 |

*(Composition 3 in Table 1 modified as discussed above)

The rubber binder and aggregate were combined to form rubber concrete by mixing the above components in a low-speed concrete mixer for 30 minutes at 25° C.

All rubber concrete sample parts were shaped by pouring the concrete mixtures into a form and using a conventional vibration table for 10 to 15 minutes at 20 to 25° C. After forming, the concrete parts underwent thermal treatment, i.e., vulcanization, as described in Example 2 for preparing a liquid ebonite coating from sample 7 (composition 3).

The compressive strength of rubber concrete samples was determined according to the method prescribed by ASTM C1013. The bending strength was determined according to the method prescribed by DIN 5345. Tensile properties were determined according to the method prescribed by ASTM D 638. Abrasion resistance was determined with a Tabor Abrader according to the method prescribed by ASTM D 4060. Water absorption was determined according to the method prescribed by ASTM D 570. $K_{CR}$ was determined as described above from the compressive strength of the samples. The main properties of the hardened rubber concrete samples are as follows.

TABLE 5

Main Properties of Hardened Rubber Concrete

| | Sample | |
|---|---|---|
| | 11 | 12 |
| Compression strength, MPa | 98.6 | 99.8 |
| Bending Strength, MPa | 33.2 | 33.0 |
| Tensile Strength, MPa | 21.4 | 21.2 |
| Young's Modulus, MPa × $10^4$ | 2.1 | 2.0 |
| Poisson's Ratio | 0.26 | 0.26 |
| Resistance to Abrasion, kg/m² × $10^{-3}$ | 1.8 | 1.7 |
| Water Absorption, wt. % over 24 hours | 0.05 | 0.04 |
| $K_{CR}$ after 360 days at 20° C. in: | | |
| 20% Aqueous Sulfuric Acid | 1.02 | 1.04 |
| 10% Aqueous Lactic Acid | 0.99 | 0.98 |
| 20% Aqueous NaOH | 1.03 | 1.01 |

While it is apparent that the illustrative embodiments of the invention herein disclosed fulfill the stated objective, it would be appreciated if numerous modifications and other embodiments were devised by those skilled in the art. Therefore, it is understood that the appended claims are intended to cover all such modifications and embodiments that approach the spirit and scope of the present invention. The contents of all patents cited herein are incorporated by reference in their entirety.

The invention claimed is:

1. A liquid solventless synthetic-rubber-based composition comprising:
   (a) a low number-average molecular weight non-functional polybutadiene rubber comprising about 75% to about 92% cis-1,4 units;
   (b) epoxy-terminated low number-average molecular weight rubber comprising butadiene-acrylonitrile copolymer with not less than 3 epoxy terminal groups per molecule, said epoxy-terminated low number-average molecular weight non-functional polybutadiene rubber being present in the amount of about 2.0 parts to about 4.5 parts by weight for 100 parts by weight of the low number-average molecular weight non-functional polybutadiene rubber;
   (c) sulfur;
   (d) a vulcanization accelerator; and
   (e) an active filler, wherein the sulfur, accelerator, and active filler are each present in the form of powder having a particle size of about 5 μm to about 85 μm.

2. The composition of claim 1, wherein the number-average molecular weight of the low number-average molecular weight non-functional polybutadiene rubber ranges from about 1,500 to about 30,000 g/mol.

3. The composition of claim 1, wherein the low number-average molecular weight non-functional polybutadiene rubber has a Brookfield viscosity of about 0.7 Pa·s to about 300 Pa·s at 20° C.

4. The composition of claim 1, wherein the epoxy-terminated low number-average molecular weight rubber is the product of the reaction of carboxyl-terminated butadiene-acrylonitrile copolymer with an excess of polyfunctional epoxy aliphatic compound.

5. The composition of claim 4, wherein the number-average molecular weight of the carboxyl terminated butadiene-acrylonitrile copolymer ranges from about 1000 g/mol to about 6000 g/mol.

6. The composition of claim 4, wherein the polyfunctional epoxy aliphatic compound selected from a group that includes glycerin triglycidyl ether, propoxylated glycerin triglycidyl ether, trimethylolpropane triglycidyl ether, trimethylolethane triglycidyl ether, polyglycerol triglycidyl ether, pentaeryithritol tetraglycidyl ether, sorbitol polyglycidyl ether.

7. The composition of claim 1, wherein about 20 parts to about 50 parts by weight of sulfur is present per 100 parts by weight of the low number-average molecular weight non-functional polybutadiene rubber.

8. The composition of claim 7, wherein about 27 to about 35 parts by weight of sulfur is present per 100 parts by weight of the low number-average molecular weight non-functional polybutadiene rubber.

9. The composition of claim 1, wherein about 2.5 parts to about 30 parts by weight of the accelerator is present per 100 parts by weight of the low number-average molecular weight non-functional polybutadiene rubber.

10. The composition of claim 9, wherein about 3.5 parts to about 22 parts by weight of accelerator is present per 100 parts by weight of the low number-average molecular weight non-functional polybutadiene rubber.

11. The composition of claim 1, wherein the accelerator is at least one material selected from a group consisting of aldehyde amines, guanidines, thiazoles, sulfenamides, dithiocarbamates, thiuram sulfides, xanthates, and morpholine disulfides.

12. The composition of claim 1, wherein the accelerator is at least one material selected from a group consisting of hexamethylene tetraamine, ethylidene aniline, diphenyl guanidine, triphenyl guanidine, di-o-tolylguanidine, mercaptobenzthiazole and the sodium salt of mercaptobenzthiazole, dibenzthiazyl disulfide, N-cyclohexylbenzthiazylsulfenamide, N-oxydiethylbenzthiazylsulfenamide, piperidine pentamethylenedithiocarbamate, zinc diethyldithiocarbamate, sodium diethyldithiocarbamate, zinc ethylphenyldithiocarbamate, tetramethylthiuram disulfide, tetraethylthiuram disulfide, tetramethylthiuram monosulfide, dipentamethylenethiuram tetrasulfide, zinc isopropyl xanthate, sodium isopropyl xanthate, zinc butyl xanthate, and bis-morpholine disulfide.

13. The composition of claim 1, wherein the accelerator is at least one material selected from a group consisting of 2-mercaptobenzothiazole, zinc 2-mercaptobenzothiazolate, zinc dimethyldithiocarbamate, zinc dimethylthiocarbamate, N,N-dimethylcyclohexylammonium dibutyldithiocarbamate, tetramethylthiuram disulfide, tetraethylthiuram disulfide, tetrabutylthiuram disulfide, benzothiazyl disulfide, tetramethylthiuram monosulfide, tetracarbonyl sulfenamide, 4,4'-dithiomorpholine, 2-benzothiazyl-N-morpholine disulfide, N,N-diphenyl morpholine, diphenylguanidine, dipentamethyl thiourea, magnesium oxide, and zinc oxide.

14. The composition of claim 1, wherein about 14 parts to about 30 parts by weight of active filler is present per 100 parts by weight of the low number-average molecular weight non-functional polybutadiene rubber.

15. The composition of claim 1, wherein about 18 parts to about 23 parts by weight of active filler is present per 100 parts by weight of the low number-average molecular weight non-functional polybutadiene rubber.

16. The composition of claim 1, wherein the active filler is selected from the group consisting of carbon black, bismuth oxide, silica, titanium dioxide, and mixtures thereof.

17. The composition of claim 1, wherein the active filler essentially consists of about 6 parts to about 9 parts by weight of bismuth oxide per 100 parts by weight of the low number-average molecular weight non-functional polybutadiene rubber and about 12 parts to about 9 parts by weight of carbon black per 100 parts by weight of the low number-average molecular weight non-functional polybutadiene rubber.

18. The composition of claim 1, wherein the sulfur, accelerator, and active filler are each present in the form of powder having a particle size of about 15 μm to about 75 μm.

19. The composition of claim 18, wherein the sulfur, accelerator, and active filler are each present in the form of powder having a particle size of about 15 μm to about 50 μm.

20. The composition of claim 1, wherein the composition further comprises at least one activator.

21. The composition of claim 20, wherein about 0.5 part to about 4.3 parts by weight of the activator is present per 100 parts by weight of the low number-average molecular weight non-functional polybutadiene rubber.

22. The composition of claim 1, wherein the composition further comprises at least one material selected from a group consisting of antioxidants, antiozonants, inhibitors, antiblocking agents, antiflex-cracking agents antislip agents, antistatic agents, UV-light adsorbers, flame retardants, fungicides, germicides, heat sensitizers, chemical stabilizers, heat stabilizers, processing aids, peptizers, plasticizers, softeners, dispersing agents, tackifiers, pigments, dyes, microperes, reinforcing agents, thixotropic agents, coupling agents, catalysts, and leveling agents.

23. A liquid solventless synthetic-rubber-based composition comprising:
   (a) a low number-average molecular weight non-functional polybutadiene rubber comprising about 75% to about 92% cis-1,4 units,
   (b) epoxy-terminated low number-average molecular weight rubber comprising butadiene-acrylonitrile copolymer with not less than 3 epoxy terminal groups per molecule, said epoxy-terminated low number-average molecular weight rubber being present in the amount of about 2.0 parts to about 4.5 parts by weight based on 100 parts of low number-average molecular weight rubber,
   (c) sulfur,
   (d) a vulcanization accelerator, and
   (e) an active filler wherein the sulfur, accelerator, and active filler are each present in the form of powder having a particle size of about 5 μm to about 85 μm and wherein the composition is vulcanized at a vulcanization temperature of about or greater than 80° C.

24. A liquid solventless synthetic-rubber-based composition, which is a liquid rubber concrete composition, comprising:
   (a) a low number-average molecular weight non-functional polybutadiene rubber comprising about 75% to about 92% cis-1,4 units,
   (b) epoxy-terminated low number-average molecular weight rubber comprising butadiene-acrylonitrile copolymer with not less than 3 epoxy terminal groups per molecule, said epoxy-terminated low number-average molecular weight rubber being present in the amount of about 2.0 parts to about 4.5 parts by weight based on 100 parts of low number-average molecular weight rubber,
   (c) sulfur,
   (d) a vulcanization accelerator,
   (e) an active filler, and
   (f) a fine aggregate wherein the sulfur and the accelerator are each present in the form of powder having a particle size of about 5 μm to about 85 μm and wherein the active filler is present in the form of powder and essentially consists of at least one first active filler with a particle size of about 5 μm to 85 μm and at least one second active filler with a particle size of greater than 85 μm to about 120 μm.

25. The liquid solventless synthetic-rubber-based composition of claim 24, wherein the composition is vulcanized at a vulcanization temperature of about or greater than 110° C.

26. The liquid solventless synthetic-rubber-based composition of claim 24, wherein at least one first active filler is present in the form of powder having a particle size of about 15 μm to 85 μm.

27. The liquid solventless synthetic-rubber-based composition of claim 24, wherein at least one second active filler is present in the form of powder having a particle size of greater than 85 μm to about 110 μm.

28. The liquid solventless synthetic-rubber-based composition of claim 24, wherein the active filler is selected from a group consisting of carbon black, silica, titanium dioxide, bismuth oxide, fly ash, and mixtures thereof.

29. The liquid solventless synthetic-rubber-based composition of claim 24, wherein the first active filler is fly ash and wherein the second active filler is carbon black.

30. The liquid solventless synthetic-rubber-based composition of claim 24, wherein about 6 parts to about 15 parts by weight of at least one first active filler is present per 100 parts by weight of the low number-average molecular weight non-functional polybutadiene rubber.

31. The liquid solventless synthetic-rubber-based composition of claim 24, wherein about 10 parts to about 30 parts by weight of at least one second active filler is present per 100 parts by weight of the low number-average molecular weight non-functional polybutadiene rubber.

32. The liquid solventless synthetic-rubber-based composition of claim 31, wherein about 10 parts to about 20 parts by weight of at least one second active filler is present per 100 parts by weight of the low number-average molecular weight non-functional polybutadiene rubber.

33. The liquid solventless synthetic-rubber-based composition of claim 24, wherein about 25 wt. % to about 60 wt. % of the active filler is present as at least one first active filler and about 75 wt. % to about 40 wt. % of the active filler is present as at least one second active filler.

34. The liquid solventless synthetic-rubber-based composition of claim 24, wherein the fine aggregate consists essentially of sand with a particle size of about 0.14 mm to and including 5 mm.

35. The liquid solventless synthetic-rubber-based composition of claim 24, wherein about 65 parts to about 88 parts by weight of aggregate is present per 100 parts by weight of the low number-average molecular weight non-functional polybutadiene rubber.

36. The liquid solventless synthetic-rubber-based composition of claim 24, wherein the composition further comprises at least one coarse aggregate.

37. The liquid solventless synthetic-rubber-based composition of claim 36, wherein the coarse aggregate is selected from a group consisting of gravel and mineral chips and wherein the grain size of the coarse aggregate is greater than 5 mm to about 70 mm.

38. The liquid solventless synthetic-rubber-based composition of claim 24, wherein the composition further comprises at least one activator.

* * * * *